United States Patent [19]

Ueda et al.

[11] 4,173,403
[45] Nov. 6, 1979

[54] SINGLE LENS REFLEX CAMERA WITH AUTOMATIC DIAPHRAGM CONTROL MECHANISM

[75] Inventors: Hiroshi Ueda, Nara; Shigeru Oyokota, Sakai; Hideo Kajita, Chihayaakasaka, all of Japan

[73] Assignee: Minolta Camera Kabushiki Kaisha, Osaka, Japan

[21] Appl. No.: 858,790

[22] Filed: Dec. 8, 1977

[30] Foreign Application Priority Data

Dec. 9, 1979 [JP] Japan ................................ 51-147133

[51] Int. Cl.² ............................................. G03B 19/12
[52] U.S. Cl. .................................................. 354/152
[58] Field of Search ........................ 354/40, 152, 156

[56] References Cited

U.S. PATENT DOCUMENTS

| 3,044,377 | 7/1962 | Gebele ..................................... 354/40 |
| 3,777,637 | 12/1973 | Kuramoto et al. ..................... 354/42 |
| 3,810,216 | 5/1974 | Ueda ..................................... 354/156 |
| 3,891,992 | 6/1975 | Ueda et al. ............................ 354/152 |
| 3,972,055 | 7/1976 | Matsuda et al. ................... 354/40 X |

Primary Examiner—John Gonzales
Attorney, Agent, or Firm—Watson, Cole, Grindle & Watson

[57] ABSTRACT

A single lens reflex camera is provided with a reflex mirror actuating mechanism and automatic diaphragm control mechanism, with each mechanism being delayed to operate at a proper speed. The diaphragm control mechanism arrests operation of a diaphragm driving means during stopping down of the diaphragm by means of an electromagnet actuated in response to the output of a diaphragm control circuit which compares set exposure factors with the brightness of an object to be photographed, while measuring the brightness through the diaphragm aperture that is being driven.

7 Claims, 2 Drawing Figures

SINGLE LENS REFLEX CAMERA WITH AUTOMATIC DIAPHRAGM CONTROL MECHANISM

BACKGROUND OF THE INVENTION

1. Field of the Invention

The present invention relates to a single lens reflex camera having diaphragm mechanism automatically controlled upon shutter releasing in accordance with scene brightness measured through the camera objective and the diaphragm aperture.

2. Prior Art

In U.S. Pat. No. 3,777,637 a single lens reflex camera of the above mentioned type is described wherein the diaphragm in an interchangeable lens, is activated upon shutter release operation through a coupling for interlocking the diaphragm control mechanisms respectively equiped in the interchangeable lens and in the camera body. Thereby the diaphragm aperture may be changed from the full to the smallest size until it is stopped or arrested by an electromagnetic means in response to an output from an exposure control circuit which compares set exposure factors with the scene brightness measured through the diaphragm aperture being changed as mentioned above. The exposure control circuit generates the output upon detecting that the diaphragm aperture, at the time when scene brightness is being measured therethrough, is proper for the scene brightness and set exposure factors, or when the output of the light measuring circuit of the exposure control circuit, which detects scene light through the diaphragm aperture, becomes proper for the set exposure factors.

This diaphragm control system is favorable in that diaphragms of various interchangeable lenses may be controlled by a single mechanism provided in the camera body, through the coupling which interlocks the diaphragm control mechanisms respectively equiped in the camera body and in an interchangeable lens mounted on the camera, for the purpose of stopping-down the diaphragm from its fully open viewing position to a photographing position of a desired aperture. However, as such coupling usually has and can have no braking mechanism, it is expected that the diaphragm and/or diaphragm control mechanism bounces and oscillates for some time after they are stopped suddenly, while being stopped-down, by the electromagnetic means. Hence, the reflex mirror of the camera should be driven from a viewing to a photographing position some time after the stopping of the diaphragm, when the diaphragm has become stable. This time is referred to hereinafter as release lag.

If the diaphragm control system is designed to provide long release lag for reducing such bounding, there results a long time lag from the shutter release operation to the actual operation of the shutter, and it is difficult to take pictures at the desired instants, especially in the case of moving objects. However, if the system is so designed to drive the diaphragm very rapidly, there results an increase of the bounce and oscillation of the diaphragm and/or its control mechanism, so that precise control of the diaphragm can not be expected.

Further, if the system is so designed that the reflex mirror is actuated at a considerably early time while the diaphragm is stopped-down at proper speed, then it is likely that the mirror is actuated before the diaphragm aperture is determined, especially in the case where the diaphragm must be stopped-down to a substantial extent.

Accordingly, it is necessary for such a system to be designed such that the release lag is short enough but not so short as to affect the precision of the diaphragm control, and so that the release lag is constant irrespective of the diaphragm aperture to be determined.

To comply with this requirement, a device has been proposed which is provided with another electromagnet for driving the reflex mirror at the proper instant as described, for example, in Japanese patent application No. 50-99731 laid open on Aug. 7, 1975. However, this proposed device is unfavorable in requiring further consumption of electric power for the additional electromagnet and control circuit therefor. As the capacity of battery ordinarily adapted for the camera is very limited, such increase of electric power consumption is undesirable. Further, due to the additional electromagnet, the camera will be more expensive and bulky. Still another disadvantage of this camera is that the camera is inoperable when the battery is exhausted.

SUMMARY OF THE INVENTION

Accordingly, the primary object of the present invention is to provide an improved automatic diaphragm control mechanism for single lens reflex cameras.

Another object of the present invention is to provide a single lens reflex camera with an improved mechanism for automatically controlling the diaphragm in accordance with the brightness of an object to be photographed, measuring the brightness through the aperture of the diaphragm which is being stopped-down at proper speed, with the reflex mirror being actuated at a proper time.

Still another object of the present invention is to provide such a diaphragm control and mirror actuating mechanism wherein the reflex mirror is actuated by an operating member which travels a distance before the actuation.

BRIEF DESCRIPTION OF THE DRAWINGS

These and other objects and advantages of the invention will become more apparent with the following description considered with the accompanying drawings in which.

DETAILED DESCRIPTION

Figure 1:
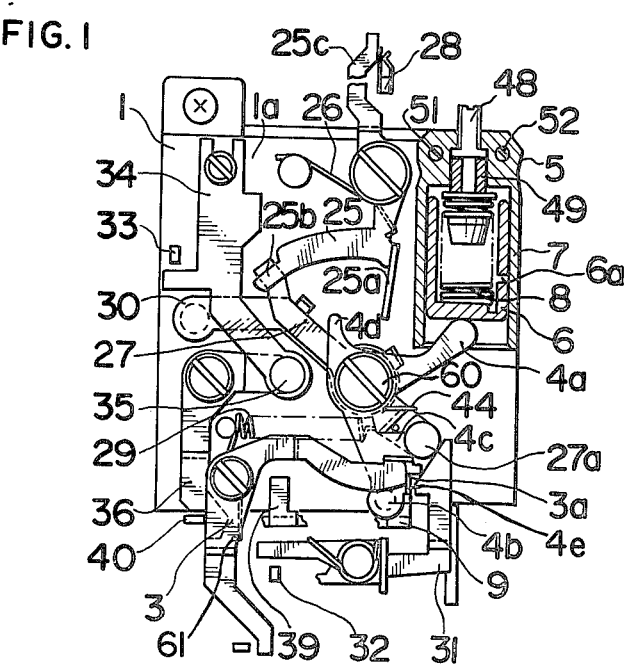
FIG. 1 is a side elevational view of a mirror box of a single lens reflex camera according to the preferred embodiment of the present invention.

A restraining lever 3 is pivoted on a side plate 1a of the mirror box 1 and is movable counterclockwise upon operation of a shutter release button (not shown). An operating lever 4 including projection 4e which is engageable with detent 3a of restraining lever 3 and has an arm 4a which is maintained in engagement with a vertically movable piston 6 of an air damper 5, which will be described in more detail below. Lever 4 is pivotally mounted on stud 60 in a manner to be freely rotatable. Lever 3 is biased clockwise by spring 61 and when lever 3 is moved counterclockwise, lever 4 is released to rotate clockwise by the force of spring 8 within piston 6.

Figure 2:
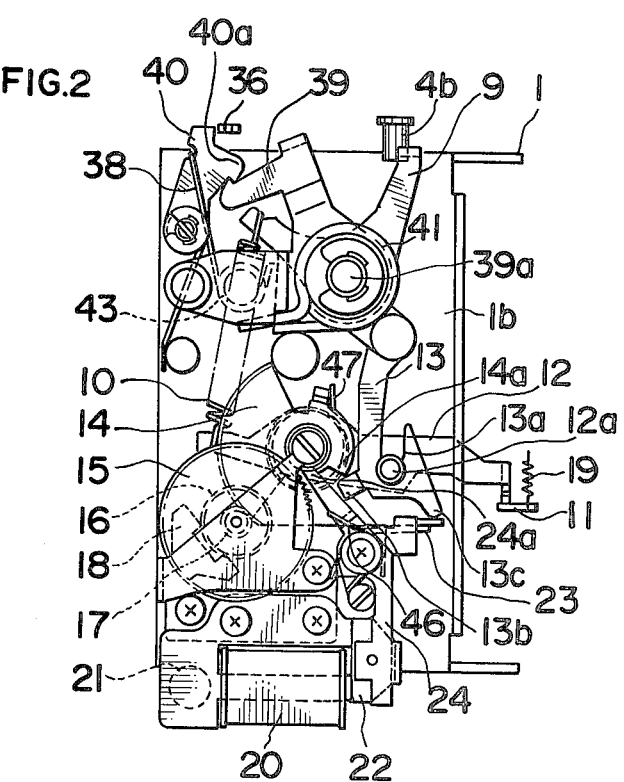
FIG. 2 is a bottom view of the mirror box of FIG. 1.

Air damper 5 includes: a cylinder 7 which is rigidly secured to side wall 1a of the mirror box; piston 6 fitted in cylinder 7 and having a ventilation hole 6a in part of the peripheral surface thereof; a threaded adjusting member extending through packing 49 in the upper portion of cylinder 7; and a drive spring 8 confined between adjusting member 48 and the inner bottom wall of piston 6. Piston 6 is given a tendency to be displaced downwards under the action of drive spring 8, while receiving a damping action due to the fluid resistance of air flowing through a peripheral gap between piston 6 and cylinder 7 until ventilation hole 6a comes out of cylinder 7. The instant the ventilation hole comes out of cylinder 7, the aforesaid damping action is released to accelerate the downward displacement of the piston, thereby rotating operating lever 4 further rapidly in the clockwise direction. A diaphragm operating lever 9, as shown in FIG. 2, is spring-loaded to rotate counterclockwise under the action of a spring 10 to engage a pin 4b carried on operating lever 4. The diaphragm operating lever 9 is, however, rotatably supported by a shaft 39a on a bottom wall 1b of the mirror box. A diaphragm aperture control member 12 is rotatably supported on bottom wall 1b. The diaphragm aperture control member has thereon a pin 12a which is in engagement under the action of spring 10 with a hook portion 13a of a connecting lever 13, which in turn is linked at one end to diaphragm operating lever 9. Diaphragm aperture control member 12 has one arm which engages a diaphragm interlocking pin 11 extending from an interchangeable lens (not shown) mounted on the camera body to operate the diaphragm in the interchangeable lens. The arm of diaphragm aperture control member 12 and diaphragm interlocking pin 11 are maintained in engagement with each other at all times under the action of a spring 19 which is tensioned between the diaphragm interlocking pin 11 and a structure in the lens and by which the diaphragm is spring-loaded to move in a direction to be stopped-down.

A sector gear 14 is spring-loaded to rotate clockwise to bring its cam portion 14a into contact with a lug 13b of connecting lever 13 under the action of spring 47. An escape wheel 16 and ratchet wheel 15 are mounted on bottom wall 1b through the shaft common to and integral with a pinion 17 meshing with sector wheel 14, and an ankle 18 is in engagement with escape wheel 16 to delay the rotation of the escape wheel, thereby forming delay means in combination.

In response to a balance signal generated by a diaphragm control circuit which compares set exposure factors with the output of a light measuring circuit (not shown), which measures light from an object to be photographed which has passed through the aforesaid diaphragm being stopped-down, an electromagnetic coil 20 for adjusting the diaphragm (FIG. 2) is excited to thereby offset a magnetic force which has been produced by a permanent magnet 21. Diaphragm locking lever 24 is provided with an armature 22, whose attraction and separation to and from a magnetic pole are governed by the magnetic force of permanent magnet 21 and electromagnet 20 and by the force of a spring 46. A lock pawl 24a, provided on one arm of diaphragm locking lever 24, is brought into engagement with a tooth of ratchet wheel 15 when armature 22 separates from the magnetic pole, thereby locking ratchet wheel 15, whereby the rotation of diaphragm preset member 12 and diaphragm interlocking pin 11 is stopped to determine the diaphrgm aperture, whereupon the counterclockwise rotation of diaphragm operating lever 9 is also stopped.

Furthermore, operating lever 4 is rotated clockwise at a speed decelerated by a delay mechanism consisting of air damper 5, which is provided independently of the delay means consisting of ankle 18 and escape wheel 16, so that pin 4b of lever 4 will be shifted leftwards, as viewed in FIG. 2, faster than the rotation of diaphragm operating lever 9, and continue to shift in that direction independently of the rotation of diaphragm operation lever 9. As soon as ventilation hole 6a in piston 6 comes out of cylinder 7, the damping action due to the viscous resistance of air become ineffective, thereby allowing operating lever 4 to rotate at an increased speed. As a result of the above-described clockwise rotation of operating lever 4, an arm 4d of operating lever 4 is brought into engagement with projection 25a of a mirror restraining member 25. Mirror restraining member 25 is spring-loaded as to rotate clockwise under the action of a spring 26 and has a hook or pawl portion 25b, which is in engagement with a mirror driving member 27 which is spring-loaded to rotate clockwise by the force of a spring 29. Mirror locking member 25 further has an arm end 25c adapted to engage a movable contact piece of a memory switch 28 normally maintained open, thereby closing the switch, and to disengage from the movable contact piece of the memory switch due to the counterclockwise rotation of mirror locking member 25 to cause the memory switch to open. Disposed in engagement with mirror driving member 27 is a connecting lever 30, which is adapted to move a movable reflex mirror (not shown) of the single lens reflex camera to a photographing position retracted from the photographic light path, in association with the clockwise rotation of mirror driving member 27. A front-curtain release member 31, which engages at one end a pin 27a provided on mirror driving member 27 under the spring action, is spring-loaded to rotate counterclockwise, so that the same can be urged counterclockwise to follow mirror driving member 27 rotating clockwise, thereby pushing a frontcurtain lock member 32 engaging therewith, whereby a front curtain of shutter is released from the locked condition.

Simultaneously with the starting of travelling of the front shutter curtain, information of the quantity of light from an object which has passed through the diaphragm aperture determined as explained above, is stored in a storing capacitor due to the opening of memory switch 28, and is applied to a shutter control circuit. After a lapse of time determined by the control circuit a rear curtain is actuated in a known manner by an output of the shutter control circuit, whereby exposure is terminated.

A sliding plate 34 is slidably supported by a pin 35 on side wall 1a of the mirror box so as to engage a signal member 33 adapted to move downwardly in association with the termination of travelling of the rear shutter curtain. Sliding plate 34 being associated with an interlocking member 36 which is also supported by pin 35 on the side wall of mirror box 1. Interlocking member 36 is engageable with a lock member 40 as best seen in FIG. 2. Lock member 40 is urged clockwise by the force of spring 38 to engage its hook or pawl portion 40a with a pawl portion of a return-movement-actuating member 39, which is supported on the bottom wall by shaft 39a common to diaphragm operating lever 9. Thus lock member 40 locks the return-movement-actuating member 39 and is spring-loaded to rotate clockwise by the strong force of the combination of a return spring 41 wound around shaft 39a and an auxiliary return spring 43 confined between lock member 40 and return spring 41, so that when return-movement-actuating member 39 is released from lock member 40, the member 39 is rotated clockwise. During its movement, the return-movement-actuating member 39 engages diaphragm operating lever 9 rotating counterclockwise, thereby urging the same clockwise against the force of spring 10, and at the same time, urges pin 4b of operating lever 4 rightwards. Operating lever 4 had been rotated clockwise as viewed in FIG. 1, and the rightward movement of operating lever 4 forces piston 6 of air damper 5 upwards. Thus, operating lever 4 brings its projection 4c into engagement with pin 27a of mirror driving member 27, thereby urging the member 27 counterclockwise, so that mirror driving member 27 and operating lever 4 are locked by mirror lock member 25 and restraining lever 3, respectively. At the same time, diaphragm operating lever 9 is urged clockwise by pin 4b, so that projection 13c of connecting lever 13 pushes a projection 23 downwardly, whereby lock lever 24 is rotated clockwise, to thereby disengage its pawl 24a from ratchet wheel 15, and at the same time, to bring armature 22 into engagement with the magnetic pole. As a result, sector gear 14 is allowed to rotate clockwise by the force of spring 47, and thus the conditions shown in FIGS. 1 and 2 are resumed.

In the operation of the mechanism, when operating lever 4 is released from restraining lever 3 in accordance with the release operation, operating lever 4 is rotated clockwise, being subjected to a damping action by air damper 5 until ventilation hole 6a in piston 6 comes out of cylinder 7 due to the downward displacement of the piston. The clockwise rotation of operating lever 4 disengages its pin 4b from diaphragm operating lever 9, thereby allowing diaphragm operating lever 9 to rotate counterclockwise, as viewed in FIG. 2, as well as rotating diaphragm control member 12 counterclockwise, and hence diaphragm interlocking pin 11 counterclockwise, whereby the diaphragm is driven in a direction to be stopped-down. During the diaphragm stopping-down operation, the diaphragm is slowly stopped-down under a delay action due to the engagement of ankle 18 with sector wheel 16, the diaphragm operating lever 9 not being engaged with pin 4b of operating lever 4 and hence not pushing the pin. When the diaphragm is stopped-down to an optimum aperture relative to the brightness of an object and set exposure factors, electromagnet 20 is excited by the output of the diaphragm control circuit including a light receiving element receiving light from the object through the diaphragm during the diaphragm-stopping-down operation, and diaphragm locking lever 24 locks ratchet wheel 15 interlocking with diaphragm operating lever 9, whereby the diaphragm aperture is determined. The time from the release operation to the determination of the diaphragm aperture is the longest in the case where the diaphragm is stopped-down to a minimum aperture. Regardless of whether such time for determining an aperture value is long or short, operating lever 4 continues clockwise rotation, and after a lapse of a given period of time, when ventilation hole 6a in piston 6 of air damper 5 is exposed from cylinder 7 and the damping action by air damper 5 becomes disabled, then the piston 6 pushes the lever at greater speed and arm 4d of operating lever 4 disengages mirror operating member 27 from mirror lock member 25. Prior to this operation, mirror lock member 25 disengages its arm end 25c from memory switch 28, thereby opening memory switch 28, and the information of the brightness of an object, which has passed through the diaphragm aperture thus determined, is stored in a memory element.

Mirror driving member 27 thus released from mirror lock member 25 is allowed to rotate clockwise to thereby turn a movable mirror from a viewing position in the photographic optical path to a picture-taking position retracted from the photographic optical path. At this time, the front shutter curtain is released from the locked condition so as to travel and initiate exposure, and then the rear shutter curtain starts travelling at a time according to information stored in the aforesaid memory element, whereby exposure commensurate with the determined diaphragm aperture is achieved.

In association with the termination of travelling of the rear shutter curtain, signal member 33 moves downwardly and urges interlocking member 36 clockwise as viewed in FIG. 1 (leftwards in FIG. 2), through the mediary of sliding plate 34.

As a consequence, return-movement-actuating member 39, supported on the shaft 39a common to diaphragm operating lever 9, is rotated clockwise by the strong forces of return spring 41 and auxiliary return spring 43. During the rotation in that direction, return-movement-actuating member 39 urges pin 4b rightwards and rotates diaphragm operating lever 9 clockwise. Operating lever 4 had been shifted leftwards (FIG. 1) and diaphragm operating lever 9 had rotated counterclockwise and stopped midway at that time.

Consequently, drive spring 8 in air damper 5 is loaded, diaphragm aperture control member 12 turns the diaphragm to its full open position, and projection 13c of connecting lever 13 rotates diaphragm lock lever clockwise, thereby bringing armature 22 into contact with the magnetic pawl 24, as well as disengaging its lock pawl 24a from ratchet wheel 15, whereby sector wheel 14 becomes free to rotate clockwise. Thus, operating lever 4 is locked by restraining lever 3 in the position shown in FIG. 1, and mirror driving member 27 is locked by mirror lock member 25, whereby the movable mirror resumes its viewing position. The counterclockwise rotation of return-movement-operating member 39 is effected in association with the film winding operation, and return-movement-operating member 39 is returned so as to be locked by lock member 38 upon termination of the film winding operation. Thus, the respective components resume the positions shown in FIGS. 1 and 2.

What is claimed is:

1. In a single lens reflex camera having a reflex mirror and adapted for use with an interchangeable lens detachably mounted on the camera body and having diaphragm and diaphragm control mechanisms including a coupling member adapted to be coupled with a camera mechanism provided in the camera body, said coupling member being interconnected with said diaphragm such that the diaphragm aperture is changed as a function of the position of said coupling member, said camera comprising:

diaphragm driving means movable from a first to a second position for stopping-down the diaphragm through said coupling member;

means for stopping the movement of said diaphragm driving means to determine the diaphragm aperture;

first delay means for delaying said diaphragm driving means;

mirror driving means movable from a cocked to an operating position for driving said reflex mirror;

restraining means for restraining said mirror driving means at said cocked position;

operating means movable from a retaining position for retaining said diaphragm driving means at said first position to an operating position for releasing said restraint on said mirror driving means, said diaphragm driving means being interlocked with said operating means to follow the latter when it moves from said retaining to said operating position; and means for acting on said operating means to force the latter to release the restraint on said mirror driving means, said means for acting including second delay means for causing release of the restraint later than the determination of the diaphragm aperture.

2. A single lens reflex camera as in claim 1 wherein said second delay means includes a cylinder having one end closed, and a piston fitted in said cylinder to form a hollow chamber interior of said cylinder and a small gap between the inner side wall of said cylinder and the outer peripheral side wall of said piston so that said piston is delayed due to the viscous resistance of air entering said hollow chamber through said gap, said piston being in engagement with said operating means.

3. A single lens reflex camera as in claim 2 further comprising means for driving said operating means from said retaining to said operating position, said means for driving being disposed between said piston and the closed end of said cylinder.

4. A single lens reflex camera as in claim 3 wherein said piston includes a ventilation hole at a position to allow air flow therethrough to said hollow chamber shortly before said operating means reaches said operating position.

5. A single lens reflex camera as in claim 3 wherein said means for driving said operating means is disposed in said hollow chamber.

6. A single lens reflex camera as in claim 2 wherein said diaphragm driving means includes a first lever engageable with said operating means, a second lever interlockable with said coupling member, an intermediate member interconnecting said first and second levers, and a spring member interconnecting said first and second levers to form a loop structure with said first and second levers, said intermediate member and said spring means, said first and second levers being pivoted on said camera such that said spring member urges said loop structure in the direction to make said first lever engage and follow said operating means.

7. A single lens reflex camera as in claim 2 wherein said first delay means includes a governor interlocked with said diaphragm driving means.

* * * * *

UNITED STATES PATENT OFFICE
CERTIFICATE OF CORRECTION

PATENT NO. : 4,173,403

DATED : November 6, 1979

INVENTOR(S) : UEDA ET AL

It is certified that error appears in the above-identified patent and that said Letters Patent are hereby corrected as shown below:

[30] Foreign Application Priority Data should read

-- Dec. 9, 1976 [JP]   Japan..........51-147133 --.

Signed and Sealed this

Twenty-ninth Day of April 1980

[SEAL]

Attest:

SIDNEY A. DIAMOND

Attesting Officer          Commissioner of Patents and Trademarks